US008370901B2

(12) United States Patent
Huang et al.

(10) Patent No.: US 8,370,901 B2
(45) Date of Patent: Feb. 5, 2013

(54) METHOD AND APPARATUS FOR PROVIDING IDENTITY MANAGEMENT FOR USERS IN A WEB ENVIRONMENT

(75) Inventors: Heyuan Huang, Beijing (CN); Bin Wang, Beijing (CN); Jing Min Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 12/507,234

(22) Filed: Jul. 22, 2009

(65) Prior Publication Data

US 2010/0024005 A1    Jan. 28, 2010

(30) Foreign Application Priority Data

Jul. 25, 2008    (CN) .......................... 2008 1 0144038

(51) Int. Cl.
*G06F 7/04*        (2006.01)
*G06F 17/30*       (2006.01)
*G06F 15/16*       (2006.01)
*H04L 29/06*       (2006.01)
*G06F 12/00*       (2006.01)
*G06F 15/00*       (2006.01)
*G06F 21/00*       (2006.01)
*G06F 13/00*       (2006.01)

(52) U.S. Cl. .................... 726/3; 726/6; 726/8; 713/164; 709/218; 709/227

(58) Field of Classification Search .................. 726/3, 6, 726/8; 713/164; 709/218, 227
See application file for complete search history.

(56) References Cited

U.S. PATENT DOCUMENTS

| 7,177,945 B2 | 2/2007 | Hong et al. |
| 2006/0075224 A1 * | 4/2006 | Tao ............................ 713/164 |
| 2009/0293108 A1 * | 11/2009 | Weeden .......................... 726/6 |

FOREIGN PATENT DOCUMENTS

| CN | 1950841 A | 4/2007 |
| WO | WO 2010106832 A1 * | 9/2010 |

OTHER PUBLICATIONS

Hidehito Gomi; "User-centric identity governance across domain boundaries"; Nov. 2009; DIM '09: Proceedings of the 5th ACM workshop on Digital identity management; Publisher: ACM; pp. 35-44.*

(Continued)

*Primary Examiner* — Eleni Shiferaw
*Assistant Examiner* — Courtney Fields
(74) *Attorney, Agent, or Firm* — Cantor Colburn LLP; Gail Zarick

(57) ABSTRACT

An identity management method, apparatus, and computer readable article of manufacture tangibly embodying computer readable instructions for executing the identity management method. The method includes: creating an association table to record a first session ID between the user and the first Web application, a second session ID between the user and the second Web application, and an association of the IDs; sending a session ID request containing the first session ID by the first Web application to a return module; receiving the session ID request and searching by the return module for the associated second session ID in the association table according to the first session ID; and returning the second session ID to the first Web application, thereby providing identity management for a user in a Web environment in which a first Web application accesses a second Web application on behalf of the user.

16 Claims, 5 Drawing Sheets

OTHER PUBLICATIONS

Xue Liu, et al., Adaptive Control of Multi-Tiered Web Applications Using Queueing Predictor, NOMS 2006. 10th IEEE/IFIP, Apr. 3-7, 2006, pp. 106-114.

Henk Jonkers et al., Metering and Reporting of Application Usage, Telematica Instituut, TNO-FEL, Atos Origin. Jan. 15, 2002, https://doc.telin.nl/dsweb/Get/File-19826.

* cited by examiner

| Session ID with the third party | The first session ID | The first session type | The second session ID | The second session type |
|---|---|---|---|---|
| ID3 | ID1 | Type 1 | ID2 | Type 2 |

| Username | Session ID | Session type |
|---|---|---|
| Tom | ID1 | Type 1 |
| Toms | ID2 | Type 2 |

METHOD AND APPARATUS FOR PROVIDING IDENTITY MANAGEMENT FOR USERS IN A WEB ENVIRONMENT

CROSS-REFERENCE TO RELATED APPLICATION

This application claims priority under 35 U.S.C. §119 from Chinese Patent Application No. 200810144038.0 filed on Jul. 25, 2008, the entire contents of which are incorporated herein by reference.

BACKGROUND OF THE INVENTION

1. Field of the Invention

This invention relates to internet identity authentication and more particularly to secure access across different Web applications.

2. Description of Related Art

As a result of the variety of the Web environment, users are able to register accounts in many Web applications to realize various functions. For example, a user may register for three Web applications with different functions, such as, blogging, using Web Album and Web Friend in order to realize the functions of editing posts, browsing photos, and browsing friends' information, by logging into these Web applications. Along with the increase in the number of registered Web applications and the popularization of user-centric identity authentication techniques, more and more users would like to use a third-party identity provider (IdP) to realize identity authentication uniformly in a plurality of Web applications. At the same time, Web application providers also would like to have integration of the plurality of Web applications by a third-party IdP to provide stronger functionality so as to attract more users.

The process of identity authentication using the IdP can be classified as identity authentication initiated from the IdP side and identity authentication initiated from the service provider side, i.e., from the Web application side. The process of identity authentication initiated from the IdP side mainly includes the following steps: a user accesses the IdP directly via a browser on the client side; the IdP requires the user to input a username and password; the ID (identity) manager in the IdP receives and checks the information inputted by the user; after checking, the IdP transfers the identity information to the identity proxy in the Web application via the browser, and thereby the Web application recognizes the user's identity and provides the desired resource.

The process of identity authentication initiated from the Web application side includes the following steps: a user accesses the required Web application via a browser on the client side; the Web application jumps to the IdP via the browser; the IdP requires the user to input the login information about identity and the ID manager therein receives and checks the login information; then the IdP returns the identity information to the identity proxy in the Web application via the browser after checking; and thereby the Web application recognizes the user's identity and provides the desired resource.

Through the above process, users can realize identity authentication in Web applications using the IdP, or identity sharing between the IdP and Web applications. However, the above mechanism does not support an access across different Web applications. If a user wants one Web application to access another Web application for him, e.g., wants the blog application to access the web album application to get his photos with the current login identity, the problem of how to realize secure access across different Web applications arises.

To solve the secure access problem across different Web applications, one solution is to transmit an SAML (Security Assertion Markup Language) token in the access request. In this process, the exchange and validation of the token is required. This increases the response time of Web applications and thus affects efficiency. In addition, the information related to users' identities is required to be inserted into the code of Web applications in this solution. This results in hidden security problems.

Another solution is a resource provider centric approach in which the resource provider defines a number of application interfaces to permit other applications to access its resources. However, different resource providers usually have their own special design and approaches. Therefore, this method cannot support universal cross-application access. Accordingly, a more safe and efficient way is needed to realize secure access across different Web applications.

SUMMARY OF THE INVENTION

In view of the above, it is an object of the present invention to provide a method and apparatus for providing identity management for users in inter-access across different Web applications.

According to an aspect of the present invention, there is provided a method for providing identity management by a computing apparatus for a user in a Web environment in which a first Web application accesses a second Web application on behalf of the user. The method includes: creating an association table by an association table module to record a first session ID between the user and the first Web application, a second session ID between the user and the second Web application, and an association of the first and second session IDs; sending a session ID request containing the first session ID by the first Web application to a session ID return module; receiving the session ID request from the first Web application by the session ID return module; searching by the session ID return module for the associated second session ID in the association table according to the first session ID contained in the session ID request; and returning the second session ID by the session ID return module to the first Web application in response to the session ID request, thereby providing identity management by a computing apparatus for a user in a Web environment in which a first Web application accesses a second Web application on behalf of the user.

According to yet another aspect, the present invention provides a session management apparatus for providing identity management for users in a Web application environment in which a first Web application accesses a second Web application on behalf of a user. The apparatus includes: an association table creation module, for creating an association table to record a first session ID between the user and the first Web application, a second session ID between the user and the second Web application, and an association of the first and second IDs; and a session ID return module which in response to a session ID request received from the first Web application, searches the associated second session ID in the association table according to the first session ID contained in the session ID request, and returns the searched second session ID to the first Web application.

According to still another aspect, the present invention provides a computer readable article of manufacture tangibly embodying computer readable instructions for executing a computer implemented method for providing identity management by a computing apparatus for a user in a Web environment in which a first Web application accesses a second Web application on behalf of the user.

The method and apparatus of this invention can avoid the transmission jam caused by the exchange of security tokens and the delayed response caused by the validation of security tokens in cross-Web application access. In addition, the method and apparatus of this invention can realize secure cross-application access simply and effectively without changing the existent code.

DETAILED DESCRIPTION OF THE PREFERRED EMBODIMENTS

The identity management method provided by this invention is implemented using the session mechanism between users and applications based on the third-party IdP. First, the implementation of the session mechanism between users and applications is introduced.

HTTP is a stateless protocol according to the design of data transmission in Web environment. That means Web applications do not have the previous information requested by the same user. For example, a user logs into a Web application with shopping functionality and wants to choose some goods to place in a shopping cart. If the Web application does not have the user's previous requested information, then each time the user chooses a piece of goods, the Web application does not data to indicate by which user the piece of goods is chosen and what kinds of goods are already chosen in the user's shopping cart. To keep this kind of information, it is necessary to use the session mechanism between users and Web applications.

Specifically, the session tracking function can be provided by a Servlet or JSP container on the Web application server side. The Servlet defines an interface which provides a method of storing and returning the standard session attributes. Among them, the session identifier is one important session attribute in the session mechanism. When a new user sends a request to a Web application, the application server returns a special identifier, usually a number, to the browser associated with the responding page. The special identifier is called a "session ID." This is a unique user identifier.

On the client side, the browser saves the session ID and sends it back to the server in each subsequent request. Usually the session ID is transmitted between the server and the browser in the form of cookie. The session ID tells the Web application that the current request is not the first request sent by the user and the server has previously created a session object for the user. In this case, the server does not create a new session object for the user, but searches for the session object with the same session ID and then associates it with the current request. Thus, the Web application realizes requests from the same user and maintains the session with the user.

Using such a session mechanism, an embodiment of the present invention provides an identity management method based on a third party in a Web environment in which one Web application accesses another Web application on behalf of a user.

Figure 1:
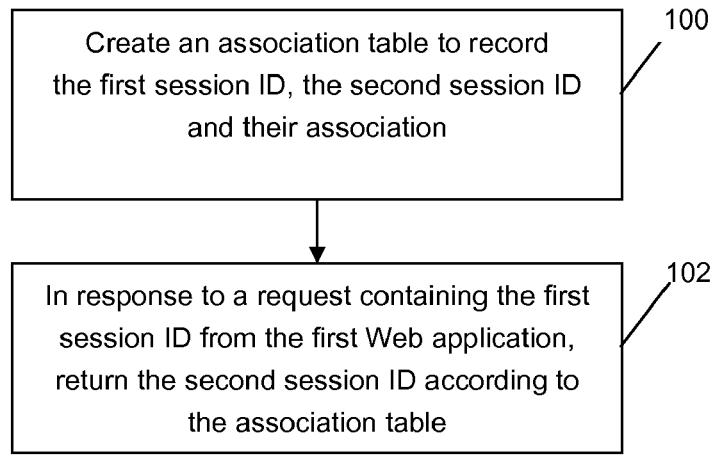
FIG. 1 shows the flowchart of identity management method according to an embodiment of the present invention.

FIG. 1 shows the flowchart of an identity management method according to the embodiments of the present invention. As shown in the figure, an association table is created at step 100 to record the first session ID, the second session ID and the association between them, in which the first session ID is the session identifier between the user and the first Web application and the second session ID is the session identifier between the user and the second Web application. Then, at step 102, the second session ID is returned according to the association table in response to a request containing the first session ID from the first Web application.

A detailed description of each step in connection with one embodiment follows. In this embodiment, it is supposed that the first Web application is a web blog, the second Web application is a web album. A user called Tom has a registered legal or legitimate identity in both Web applications and wants the web blog to access the web album on his behalf to get photos from the album. A third party independent of the web blog and the web album provides identity management for the blog accessing the album on behalf of Tom.

Before the execution of step 100, identity authentication is needed when the user logs into the first or second Web application.

In one embodiment, identity authentication in the first and the second Web applications is performed uniformly using the above third party for identity management. The authentication process includes identity authentication when the user logs into the blog, i.e., the first Web application, and when the user logs into the album, i.e., the second Web application.

Figure 2:
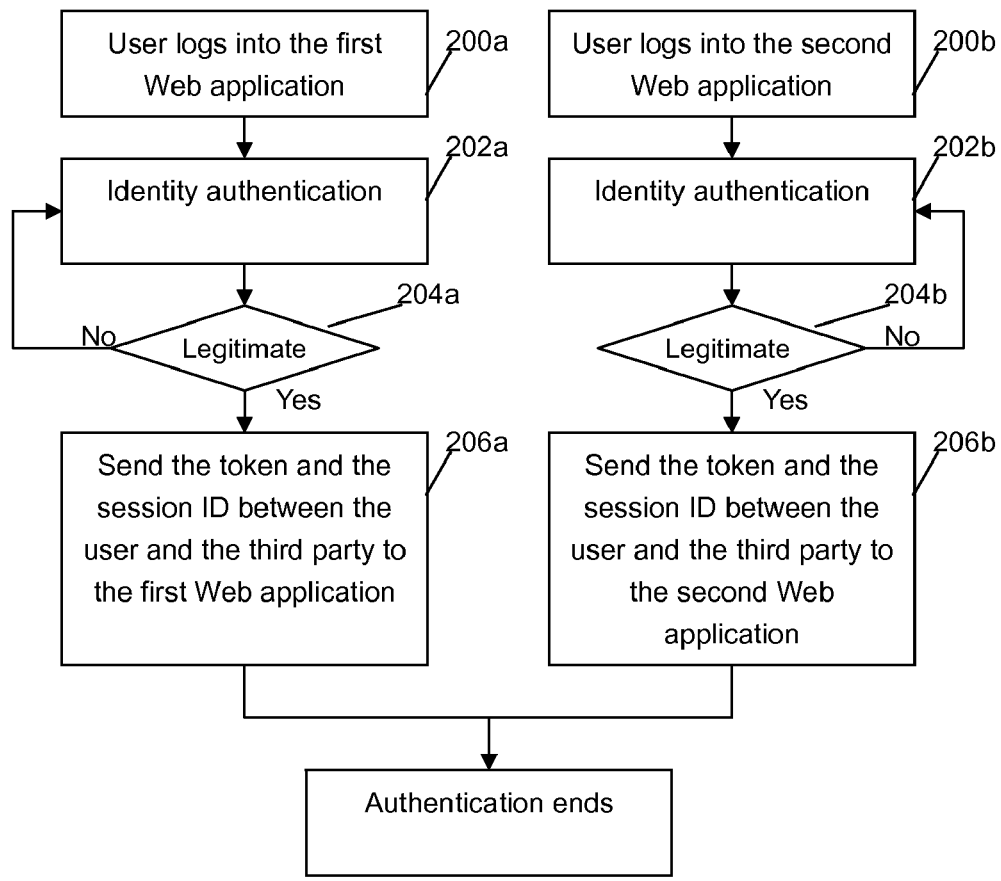
FIG. 2 illustrates the flowchart for the identity authentication process according to an embodiment of the present invention.

FIG. 2 illustrates the flowchart of the identity authentication process according to an embodiment of the present invention. In FIG. 2, the identity of the user is authenticated when the user logs into the first Web application from step 200a to step 206a, and the identity of the user is authenticated when the user logs into the second Web application from step 200b to step 206b. Specifically, the user logs into the first Web application at step 200a, and the third party for identity management authenticates the user's identity at step 202a.

This process is similar to the identity authentication process using the current IdP. That is, when the user accesses the first Web application, e.g., the blog, via the browser at the client side, the blog jumps to the third party via the browser, and the third party requires the user to input login information related to the identity. When the user inputs, for example, his username Tom and password registered in the blog, the third party checks whether the login information is valid or not according to the configured identity management information, as shown in step 204a. If the identity is invalid, the process goes back to step 202a, at which the user is required to input his identity information again. If the identity is valid, the process goes forward to step 206a.

At step 206a, the third party returns a token and the third session ID to the first Web application. The token contains the user's identity information and a third session ID which is the session ID between the user and the third party. In the above-stated session mechanism, the session ID is the unique user identifier, which is only related to the assigned user. The returning process is mainly to post the token and session ID to the first Web application via the client browser. Thereby the third party finishes the identity authentication for the user in the first Web application.

Similarly to step 200a to 206a, step 200b to 206b can achieve the identity authentication for the user in the second Web application, where after the user's identity in the second Web application is checked as valid, a fourth session ID is returned to the second Web application. This session ID is the identifier between the user logging into the second Web application and the third party. Those skilled in the art should understand that, there is no limitation or restriction to the sequence of identity authentication for the user logging into the two Web applications.

Particularly, in the case where both the first Web application and the second Web application perform identity authentications using the same third party, performing the authentication only one time is sufficient for the same user. For example, one user first logs into the first Web application and then logs into the second Web application after passing the identity authentication. Here, because the user is using the same third party, the third party does not need to authenticate the user's identity again. That is, step 202b to 204b can be skipped.

In another embodiment, the first Web application and the second Web application perform identity authentications using different IdPs. In addition, it is possible that a user may register different usernames in different Web applications. For example, the same user registers username Tom in the blog and Toms in the web album, and the blog application uses a first IdP to perform an identity authentication and the web album uses a second IdP to perform an identity authentication.

In this case, the user's identities in these two Web applications should be authenticated separately using their own IdPs and not using the same third party in the above-stated embodiment. Correspondingly, the third party needs not to return tokens and session IDs to the first and the second Web application. The above process using different IdPs in respective authentication is similar to the known traditional process using IdP in authentication.

After the user passes an identity authentication and logs into the first Web application and the second Web application, step 100 in FIG. 1 can be executed. At this step, an association table is created to record the first session ID, the second session ID and their association, in which the first session ID is the session identifier between the user and the first Web application when the user logs into the first application after identity authentication. Similarly, the second session ID is the session identifier between the user and the second Web application. The association table creation process is shown in FIG. 3a and FIG. 3b.

Figure 3A:
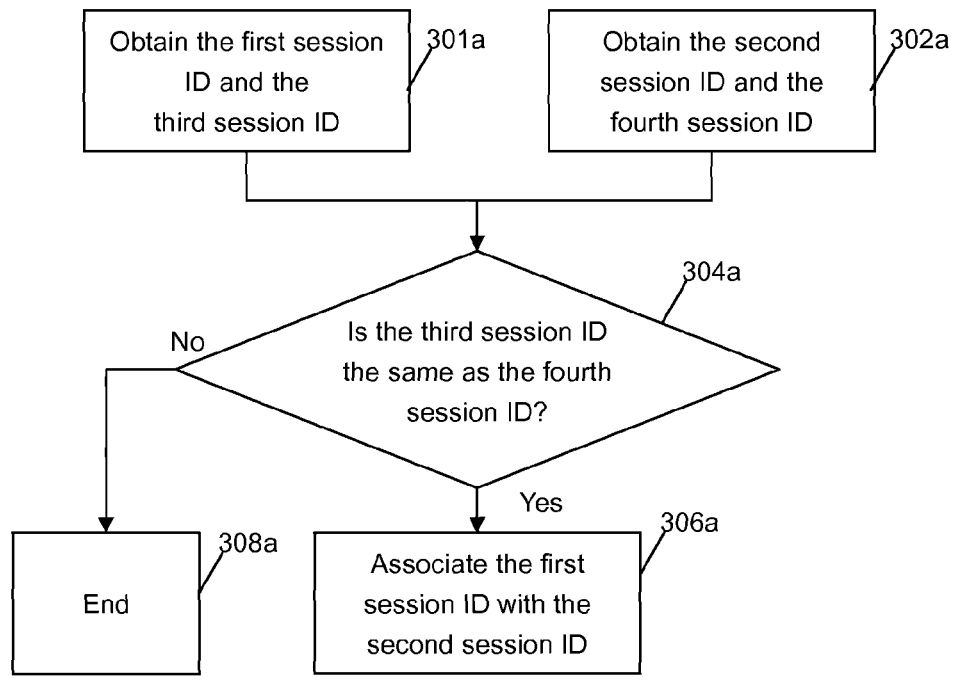
FIG. 3a illustrates the flowchart of the association table creation process according to an embodiment of the present invention.

FIG. 3a illustrates the flowchart of the association table creation process according to an embodiment of the present invention. The process is based on that shown in FIG. 2. As shown in FIG. 3a, the first session ID and the third session ID are obtained at step 301a. As stated above, when the user logs into the first Web application successfully, the first Web application creates the first session ID with the user and gets the third session ID from the third party. Thus, the third party can now get the first session ID and the third session ID from the first Web application. Similarly, the third party can get the second session ID between the user and the second Web application and the fourth session ID from the second Web application at step 302a. It should also be understood that there is no sequence limitation between step 301a and 302a as long as the third party can ultimately get the above-stated session IDs.

After the session IDs are obtained, the third session ID and the fourth session ID are compared or judged at step 304a. As described above, session IDs and users have a one-to-one correspondence and there is only one unique session ID between the same user and the third party. That is, the third party only assigns one session ID for the same user. Therefore, it is understood that if the third session ID returned to the first Web application is the same with the fourth session ID returned to the second Web application, the comparison shows that the user logging into the first Web application and the user logging into the second Web application are the same. Otherwise, the comparison shows that the users logging into these two Web applications are different. Thus, if the comparison result of step 304a is "Yes", i.e., the third session ID is the same with the fourth session ID, then at step 306a the first session ID and the second session ID are seen to be the session IDs of the same user in different Web applications. Then they are associated. If the comparison result of step 304a is "No", then at step 308a the association table creation process is terminated.

Figure 3B:
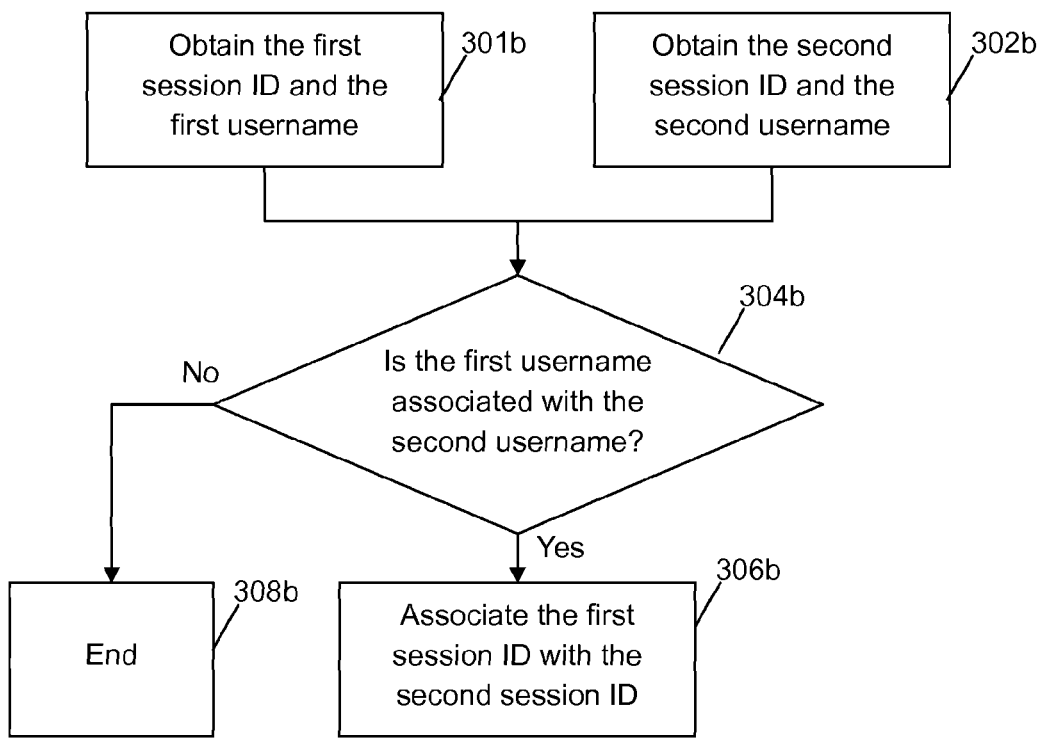
FIG. 3b illustrates the flowchart of the association table creation process according to another embodiment of the present invention.

FIG. 3b illustrates the flowchart of the association table creation process according to another embodiment of the present invention. The process aims at the situation where the same user has different usernames in the first and second Web applications. In this case, the third party needs to store the usernames of the same user in the first and the second Web application and associate them in advance. For example, the third party can create a username association table to associate the username Tom in the first Web application, e.g., the blog, with the username Toms in the second Web application, e.g., the web album. Based on this, the association table between the first session ID and the second session ID can be created.

As shown in FIG. 3b, the first session ID and the first username are obtained at step 301b, in which the first session ID is the session identifier between the first Web application and the user, the first username is the username registered in the first Web application, e.g., Tom. Similarly, the second session ID between the second Web application and the user, and the second username registered in the second Web application, e.g., Toms, are obtained from the second Web application at step 302b. It is also understood that there is no order limitation between step 301b and 302b.

After getting the above-stated session IDs and usernames, the first username and the second username are compared at step 304b. Then, the username association table is checked to judge whether there exists association between the first username and the second username. If there is association between the first username and the second username, the comparison shows that the users logging into the first Web application and the second Web application are actually the same user. Otherwise, the comparison shows that the users logging into these two Web applications are different. Thus, if the comparison result of step 304b is "Yes", then at step 306b the first session ID and the second session ID are regarded as the session IDs of the same user in different Web applications and then they are associated. If the comparison result of step 304b is "No", then at step 308b the association table creation process is ended.

Figures 4A, 4B, 5:
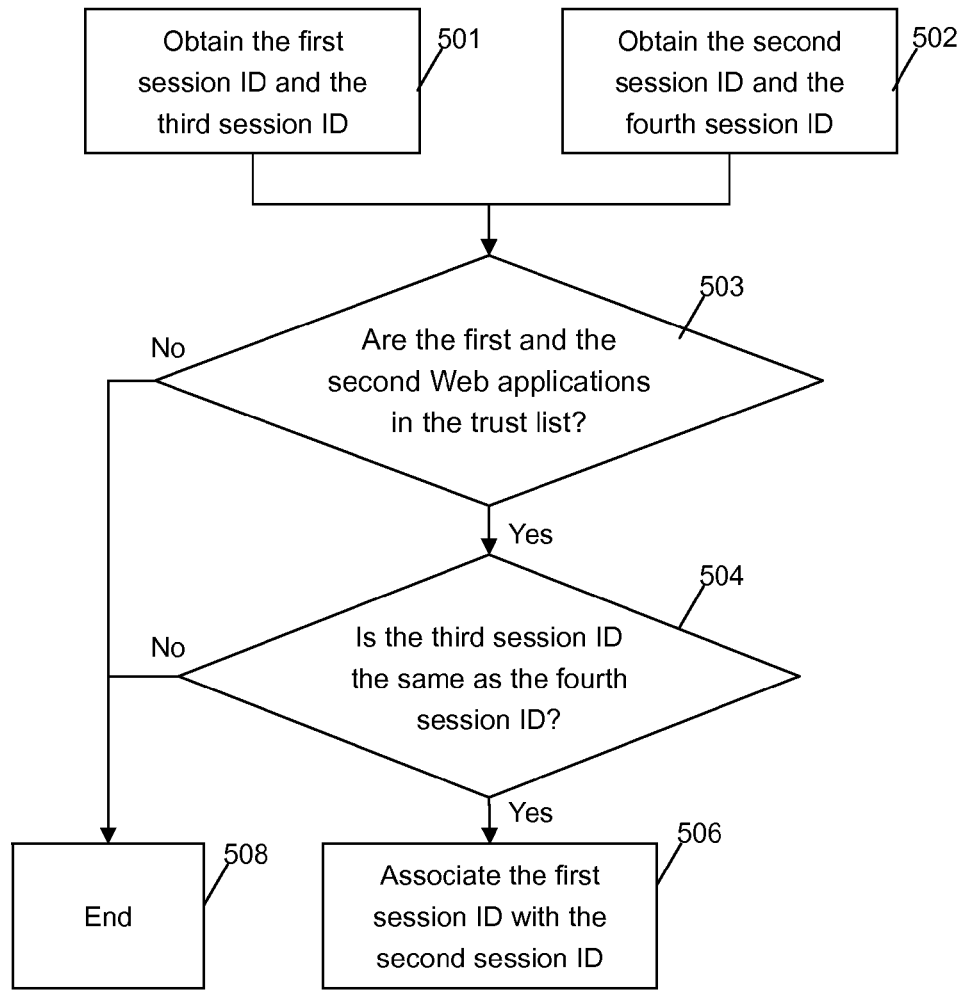
FIG. 4a shows an association table according to an embodiment of the present invention.
FIG. 4b shows an association table according to another embodiment of the present invention.
FIG. 5 illustrates the flowchart for the association table creation process according to yet another embodiment of the present invention.

There are various ways to associate the first session ID and the second session ID. FIG. 4a shows an association table according to an embodiment of the present invention. In the table illustrated by FIG. 4a, the first session ID and the second session ID are associated using the session ID between the same user and the third party as a medium. As shown in the Figure, the session ID, ID3, between the user and the third party, i.e., the third or the fourth session ID, the first session ID, ID1, between the same user and the first Web application, and the second session ID, ID2, between the same user and the second Web application are recorded in the same row, which indicates that they are associated. Additionally, the first session type and the second session type can be alternatively included in the table to record the session types between the user and each Web application for future use. Session types can include designations such as PHP, ASP, or JSP, for example.

FIG. 4b shows an association table according to another embodiment of the present invention. In the table shown by FIG. 4b, the first session ID and the second session ID are associated using the username as a medium. As shown in FIG. 4b, after referring to the username association table and determining that there exists an association between usernames Tom and Toms, the first session ID, ID1, related to Tom and the second session ID, ID2, related to Toms are listed in the same column to show their association. Those skilled in the art should understand that the association table can use other forms as long as it can build a mapping relationship between the first session ID and the second session ID. Moreover, the association table in FIGS. 4a and 4b is only an exemplary part of one kind of association table. It is understood that the association table can contain more users, more trusted Web applications and other parameters relating to the session, e.g., session overtime.

After creating the association table between the first session ID and the second session ID, the method in this embodiment goes to step 102 in FIG. 1. In step 102, according to the association table, the second session ID is returned responding to the request containing the first session ID from the first Web application. This step can be executed when the first Web application is accessing the second Web application on behalf of the user, or during the login phase or the system idle phase after login. Here, the third party receives the request from the first Web application which asks for the second session ID with the first session ID. After receiving the request, the third party extracts the contained first session ID, searches the created association table, e.g., the association table illustrated in FIGS. 4a and 4b, finds the second session ID associated with the first session ID according to the above association table, and returns the second session ID to the first Web application. Thereby, the first Web application obtains the second session ID between the user and the second Web application, by which it may access the second Web application on behalf of the user.

If the second session ID associated with the first session ID is not searched in the association table, it can be that the user has not logged into the second Web application yet and the third party has not obtained the second session ID, the fourth session ID or the second username. Thus, the association table has not been created yet. In this case, the third party returns a null or exception signal to let the user log into the second Web application to finish step 200b to 206b in FIG. 2, and step 302a in FIG. 3a or step 302b in FIG. 3b.

The above embodiments are based on the assumption that there is a trust relationship between the first Web application and the second Web application, e.g., that one is allowed to access the other on behalf of legitimate users. In a more general situation, the method of yet another embodiment of this invention also includes the step of creating a trust list. The trust list is used to record the trust relationship among different Web applications. The step of creating the trust list can be executed in any phase before step 102 in FIG. 1.

Based on the created trust list, the trust relationship between the first Web application and the second Web application can be verified by checking the trust list at step 100 or step 102 in FIG. 1.

FIG. 5 illustrates the flowchart of the association table creation process according to yet another embodiment of the present invention. The process is based on that in FIG. 3a. For the steps of FIG. 5 and FIG. 3a, the same steps are labeled using numerals with the same last two numbers. It can be seen that compared to FIG. 3a, in FIG. 5 a comparing step 503 is added, in which the first Web application and the second Web application are checked for whether they are in the trust list or not. If the checking result is that they are in the trust list, it shows that there exists a trust relationship between the first Web application and the second Web application. Then the third session ID and the fourth session ID are compared or checked at step 504. If the checking result is that they are not in the trust list, the comparison shows that access directly between the first Web application and the second Web application is not allowed. Then the association table creation process is terminated at step 508 and the third and the fourth session ID need not to be checked. It is understood that step 503 can also be executed between step 504 and step 506. A comparing step (not shown) can also be added to the process of FIG. 3b.

In another embodiment, the trust relationship between the first Web application and the second Web application is checked when executing step 104 in FIG. 1. After receiving the request from the first Web application asking for the second session ID with the first session ID, the third party checks the trust list to judge whether the first Web application and the second Web application are in the trust list or not. If these two Web applications are in the trust list, they are regarded as trusted by each other. Thus, the association table is searched to find the second session ID associated with the first session ID, and then the searched second session ID is returned to the first Web application. If these two Web applications are not in the trust list, the process is ended and the association table is not searched.

As described above, a third party which is independent of the first Web application and the second Web application can perform identity management for the first Web application accessing the second Web application on behalf of a user. Correspondingly, on the Web application side, an embodiment of the present invention also provides a method for the first Web application to access the second Web application for a user. The flowchart for this method is shown in FIG. 6.

Figure 6:
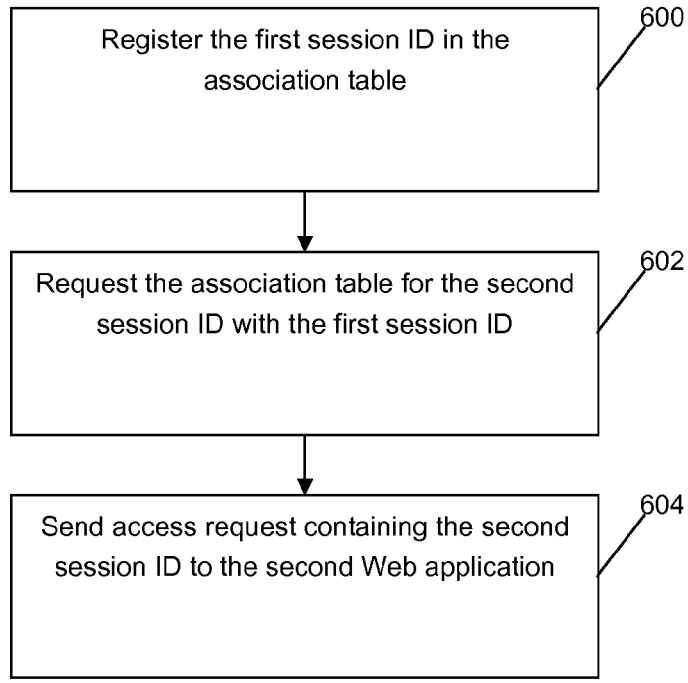
FIG. 6 illustrates the flowchart for accessing the second Web application from the first Web application according to an embodiment of the present invention.

FIG. 6 illustrates a flowchart of a process for accessing the second Web application from the first Web application according to an embodiment of the present invention. The steps in this method are all executed on the first Web application side. As shown in FIG. 6, the first session ID between the user and the first Web application is first registered in the association table at step 600. The step is usually executed when the user logs into the first Web application.

As described above, according to the session mechanism between a user and a Web application, when a user logs into the first Web application, the first Web application assigns a session ID, i.e., the first session ID, to the user and uses this session ID in the future interactions with the user in order to recognize the user's identity. Similarly, the second Web application also assigns a second session ID to the user. Also assigned to the user, the session IDs are registered in the association table, which records the first session ID, the second session ID and their association. The association table is usually created and maintained by the third party, which is independent of the first and second Web applications.

With the first session ID, the first Web application requests the association table for the second session ID at step 602. The step can be executed when the first Web application is accessing the second Web application or in any phase after the user logs into the first Web application and the second Web application. Specifically, the first Web application sends a request containing the first session ID between the user and the first Web application to the association table. In this way, the association table can find the associated second session ID according to the first session ID and return it to the first Web application.

As described above, if the association table cannot find the second session ID associated with the first session ID, it will return a null or exception signal. This usually results because that the user has not logged into the second Web application and registered the second session ID. Thus, when the first Web application receives the null or exception signal, the URL is redirected to the second Web application to make the user log into the second Web application. After logging into the second Web application, the user is again directed to the callback URL of the first Web application, which sends the request to the association table again until it gets the second session ID.

After getting the second session ID, the first Web application is ready to access the second Web application on behalf of the above-stated user. That is, the first Web application sends the request containing the second session ID to the second Web application at step 604. Specifically, there are various ways to contain the second session ID in the request. For example, the first Web application can add the second session ID into the HTTP header information, and can also attach the second session ID to the URL directed to the second Web application. Then, the first Web application can wrap the request in a conventional way and send the wrapped request to the second Web application.

In a detailed embodiment, the association table also stores the session types between the user and each Web application. Thus the first Web application can also obtain the session type information from the association table. In this way, according to the session type information, the first Web application can properly attach the second session ID to the access request and properly wrap the request. Correspondingly, when receiving such an access request, the second Web application first analyses the request source. Since the request contains the second session ID which is a legitimate session identifier between the second Web application and the user, the second Web application regards the request as legitimate on behalf of the user and allows the requested operation. Thus, using the session ID between the user and the second Web application, the first Web application can realize the objective of accessing the second Web application on behalf of the user.

Based on the same conception, an embodiment of the present invention also provides an identity management apparatus for users, which can realize the above-stated identity management method acting as the above-stated third party.

Figure 7:
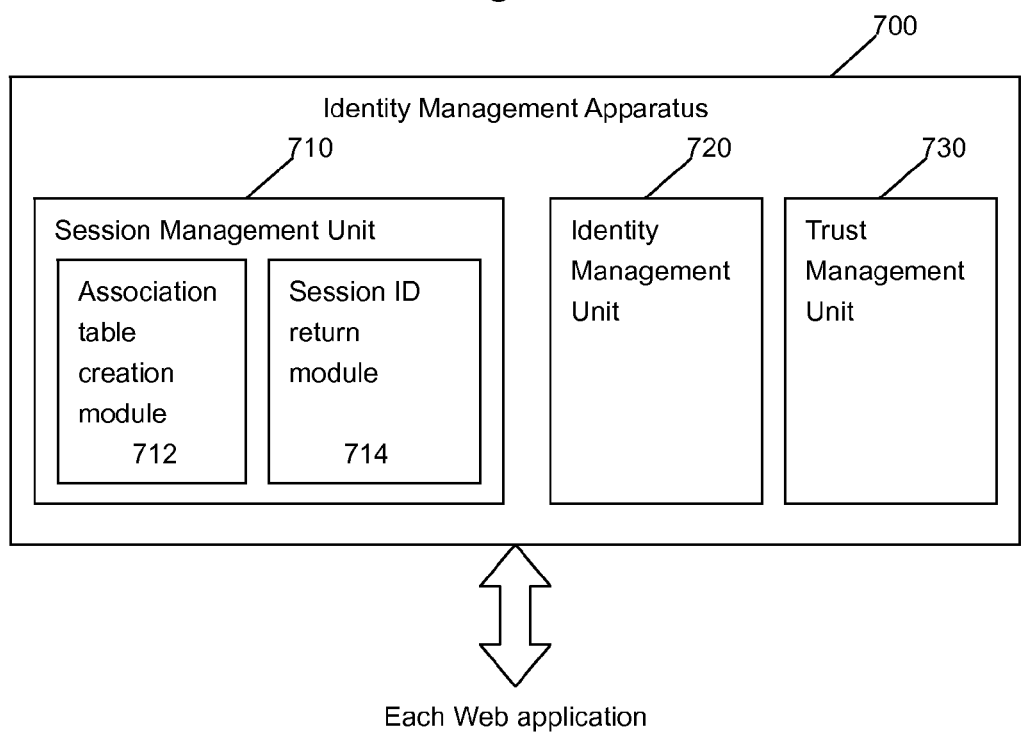
FIG. 7 illustrates the identity management apparatus according to an embodiment of the present invention.

FIG. 7 illustrates the identity management apparatus according to an embodiment of the present invention. As shown in FIG. 7, the identity management apparatus is indicated by numeral 700. The apparatus is used to provide identity management for users in Web application environments in which the first Web application accesses the second Web application on behalf of a user. Therefore, the apparatus 700 includes a session management unit 710, which further includes an association table creation module 712 and a session ID return module 714, where the association table creation module 712 creates an association table to record the first session ID between the user and the first Web application, the second session ID between the user and the second Web application, and their association, and the session ID return module 714, in response to the received request from the first Web application, searches the associated second session ID in the association table with the first session ID contained in the request, and returns the found second session ID to the first Web application.

The identity management apparatus may further include an identity management unit 720. In one embodiment, the identity management unit 720 authenticates a user's identity in the first Web application or the second Web application in response to the user logging into the first Web application or the second Web application. When the user logs into the first or the second Web application, the identity management unit 720 requires the user to input identity-related login information. After the user inputs the registered information, e.g., the username and password in the first or the second Web application, the identity management unit 720 checks whether the login information is legitimate or not according to the identity management information. If the information is legitimate, the user is allowed to login. Otherwise the login of the user is rejected.

The identity management unit 720 returns a third session ID associated with the user to the first Web application when the user logs into the first Web application; and returns a fourth session ID associated with the user to the second Web application when the user logs into the second Web application. When the user successfully logs into the first Web application, the identity management unit 720 returns the third session ID, which is the session identifier between the user and apparatus 700 and thus unique to the unique user, to the first Web application by way of the browser on the client side. Similarly, the fourth session ID between the user and apparatus 700 is created when the user successfully logs into the second Web application and is returned to the second Web application by the identity management unit 720. In this way, the identity management unit 720 performs the identity authentication for the user logging into the first or second Web application.

Alternatively, in another embodiment, the identity management unit 720 can further be configured and can create and maintain the association between different usernames of the user in the first or second Web application. This configuration is suitable for the situation where one user registers different usernames in different Web applications.

Corresponding to the configuration of the identity management unit 720 in the above-stated first embodiment, after the user successfully logs into the first Web application, the first Web application creates the first session ID for the user and gets the third session ID returned from the identity management unit 720. Similarly, the second Web application creates the second session ID and gets the returned fourth session ID. Based on this, the association table creation module 712 can get the first session ID and the third session ID from the first Web application; get the second session ID and the fourth session ID from the second Web application; and associate the first session ID and the second session ID according to the third session ID and the fourth session ID.

As described above, because the third session ID and the fourth session ID are the session identifiers between the user and the identity management apparatus 700, thus unique to a certain user, if the third session ID and the fourth session ID are the same, showing that the users logging into the first Web application and the second Web application are the same, then the first session ID and the second session ID can be associated.

In another embodiment, after the user successfully logs into the first and the second Web application, the association table creation module 712 separately gets the first session ID and the first username from the first Web application, the second session ID and the second username from the second Web application, then compares the association relationship between the first username and the second username according to the username association table stored in the identity management unit 720 and thereby associate the first session ID and the second session ID.

Alternatively, the identity management apparatus 700 can further include a trust management unit 730 to create a trust list to record the trust relationship between Web applications. In this embodiment, the trust list records at least the relationship between the first Web application and the second Web application. In the case that the identity management apparatus 700 includes the trust management unit 730, the association table creation module 712 further creates the association table according to the trust list. When creating the association table, the association table creation module 712 refers to the trust relationship recorded in the trust list and only associates the session IDs between the same user and different Web applications having trust relationship with each other. Also, the session ID return module 714 can return the second session ID according to the association table and the trust list in response to the first session ID received from the first Web application. When the session ID return module 714 receives the request which asks for the second session ID with the first session ID from the first Web application, it refers to the trust list. If there are records of the trust relationship between the first Web application and the second Web application in the trust list, it returns the second session ID obtained through searching of the association table.

Figure 8:
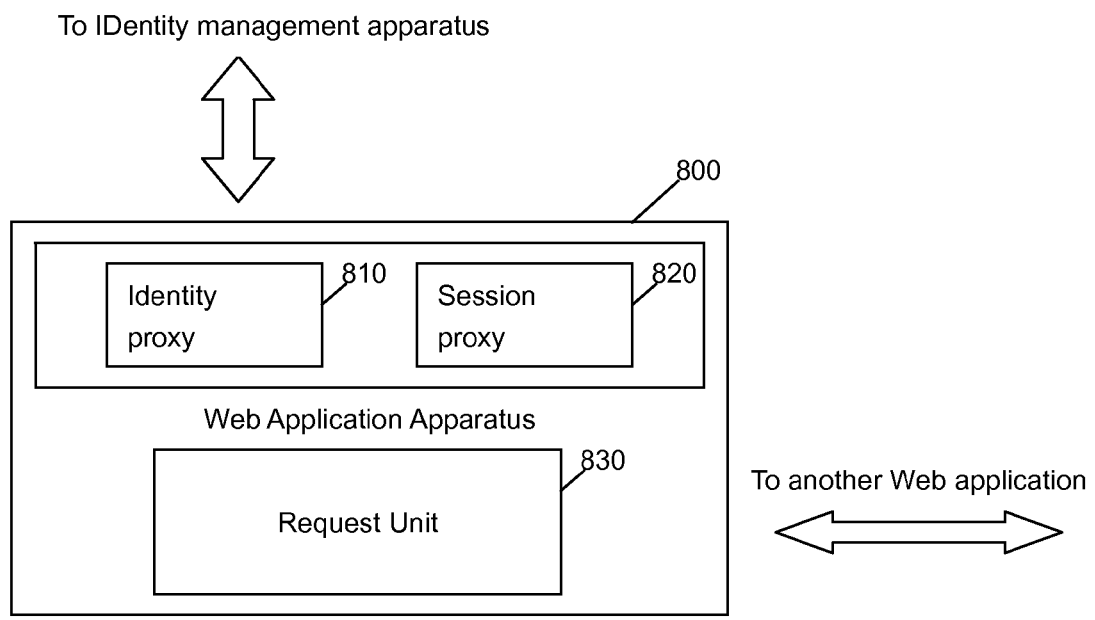
FIG. 8 illustrates the Web application apparatus according to an embodiment of the present invention.

Correspondingly, an embodiment of the present invention also provides a Web application apparatus to access another Web application on behalf of a user. FIG. 8 illustrates the Web application apparatus according to an embodiment of the present invention.

As shown in FIG. 8, the Web application apparatus indicated by numeral 800 communicates with a third party for identity management and another Web application, and in this way accesses another Web application on behalf of a user by using a third party. The Web application apparatus includes an identity proxy 810, a session proxy 820 and a request unit 830.

The identity proxy 810 identifies the user's identity. When the user logs into the Web application apparatus, the third party authenticates the user's identity and returns a token and other information to the Web application apparatus 800. The identity proxy 810 receives the token and identifies the user's identity information from the token. The session proxy 820 registers the first session ID between the user and the apparatus 800 in the association table, which is used to record the first session ID, the second session ID between the user and another Web application, and their association. The association table can be created and maintained by the third party independent of the Web applications. Further, the session proxy 820 can request the association table for the second session ID with the first session ID. Based on this, the request unit 830 can send the request which contains the second session ID to another Web application.

It is understood that a network is necessary in the transmission of data such as session IDs and the interaction between the identity management apparatus 700 and the Web application, and also between different Web applications. To ensure the transmission security, security protocols like SSL (Security Sockets Layer) and TLS (Transport Layer Security) can be adopted in data transmission.

The identity management method for users provided in the embodiments of the present invention can be realized using the above identity management apparatus for users in Web environments. The method of accessing another Web application on behalf of a user in the embodiments of this invention can be realized by means of the above Web application apparatus.

Those skilled in the art should recognize that the above described methods and apparatuses can be implemented using the executable instructions in a computer and/or the controlling codes in processors, e.g., the codes embodied in media like disc, CD or DVD-ROM; memories like ROM or EPROM; and carriers like optical or electronic signal carrier. The identity management apparatus and Web application apparatus and their modules in the embodiments can be realized using hardware like VLSI or gate array components, such as semiconductors, e.g., logic chips, transistors, or programmable hardware equipment, e.g., FPGA, programmable logic apparatus, or by using software executed by processors; or by using integrated hardware and software.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for providing identity management by a computing apparatus for a user in a Web environment in which a first Web application accesses a second Web application on behalf of the user, the method comprising:
    creating an association table by an association table module to record a first session identity (ID) between the user and the first Web application, a second session ID between the user and the second Web application, and an association of the first and second session IDs;
    sending a session ID request containing the first session ID by the first Web application to a session ID return module;
    receiving the session ID request from the first Web application by the session ID return module;
    searching by the session ID return module for the associated second session ID in the association table according to the first session ID contained in the session ID request;
    returning the second session ID by the session ID return module to the first Web application in response to the session ID request, thereby providing identity management by a computing apparatus for a user in a Web environment in which a first Web application accesses a second Web application on behalf of the user; and
    authenticating the user's identity in the first Web application and the second Web application, wherein authenticating the user's identity in the first Web application comprises returning a third session ID associated with the user to the first Web application; and authenticating the user's identity in the second Web application comprises returning a fourth session ID associated with the user to the second Web application.

2. The method of claim 1, wherein returning the third session ID to the first Web application and the fourth session ID to the second Web application comprises transmitting the third session ID to the first Web application and the fourth session ID to the second Web application by way of the user's web browser.

3. The method of claim 1, wherein the step of creating an association table by the association table module comprises:
obtaining the first session ID between the user and the first Web application and the third session ID from the first Web application;
obtaining the second session ID between the user and the second Web application and the fourth session ID from the second Web application; and
associating the first session ID and the second session ID according to the third session ID and the fourth session ID.

4. The method of claim 1, wherein the step of creating an association table by an association table module comprises:
obtaining the first session ID between the user and the first Web application and a first username of the user in the first Web application from the first Web application;
obtaining the second session ID between the user and the second Web application and a second username of the user in the second Web application from the second Web application; and
associating the first session ID and the second session ID according to the first username and the second username.

5. The method of claim 1, further comprising creating a trust list by a trust management unit to record at least the trust relationship between the first Web application and the second Web application.

6. The method of claim 5, wherein the step of creating an association table comprises creating the association table according to the trust list.

7. The method of claim 5, wherein the step of returning the second session ID comprises returning the second session ID according to the trust list.

8. The method of claim 1, further comprising:
sending an access request containing the second session ID by the first Web application to the second Web application;
wherein sending the access request comprises adding the second session ID to the HTTP header information or attaching the second session ID to the URL sent to the second Web application.

9. A computer readable storage device tangibly embodying computer readable instructions which, when implemented, causes a computer apparatus to carry out the steps of a method, comprising:
creating an association table by an association table module to record a first session ID between the user and the first Web application, a second session ID between the user and the second Web application, and an association of the first and second session IDs;
sending a session ID request containing the first session ID by the first Web application to a session ID return module;
receiving the session ID request from the first Web application by the session ID return module;
searching by the session ID return module for the associated second session ID in the association table according to the first session ID contained in the session ID request;
and returning the second session ID by the session ID return module to the first Web application in response to the session ID request, thereby providing identity management by the computing apparatus for a user in a Web environment in which a first Web application accesses a second Web application on behalf of the user;
and authenticating the user's identity in the first Web application and the second Web application, wherein authenticating the user's identity in the first Web application comprises returning a third session ID associated with the user to the first Web application; and authenticating the user's identity in the second Web application comprises returning a fourth session ID associated with the user to the second Web application.

10. The computer readable storage device of claim 9, wherein returning the third session ID to the first Web application and the fourth session ID to the second Web application comprises transmitting the third session ID to the first Web application and the fourth session ID to the second Web application by way of the user's web browser.

11. The computer readable storage device of claim 9, wherein the step of creating an association table by the association table module comprises: obtaining the first session ID between the user and the first Web application and the third session ID from the first Web application; obtaining the second session ID between the user and the second Web application and the fourth session ID from the second Web application; and associating the first session ID and the second session ID according to the third session ID and the fourth session ID.

12. The computer readable storage device of claim 9, wherein the step of creating an association table by an association table module comprises: obtaining the first session ID between the user and the first Web application and a first username of the user in the first Web application from the first Web application; obtaining the second session ID between the user and the second Web application and a second username of the user in the second Web application from the second Web application; and associating the first session ID and the second session ID according to the first username and the second username.

13. The computer readable storage device of claim 9, further comprising creating a trust list by a trust management unit to record at least the trust relationship between the first Web application and the second Web application.

14. The computer readable storage device of claim 13, wherein the step of creating an association table comprises creating the association table according to the trust list.

15. The computer readable storage device of claim 13, wherein the step of returning the second session ID comprises returning the second session ID according to the trust list.

16. The computer readable storage device of claim 9, further comprising: sending an access request containing the second session ID by the first Web application to the second Web application; wherein sending the access request comprises adding the second session ID to the HTTP header information or attaching the second session ID to the URL sent to the second Web application.

* * * * *